US010155431B2

(12) United States Patent
Luley et al.

(10) Patent No.: US 10,155,431 B2
(45) Date of Patent: Dec. 18, 2018

(54) FILTER ELEMENT HAVING A FLAP AND A FILTER SYSTEM

(71) Applicant: Mann+Hummel GMBH, Ludwigsburg (DE)

(72) Inventors: Oliver Luley, Speyer (DE); Benoit Tronet, Bad Schoenborn (DE); Stefan Diersch, Trebgast (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 213 days.

(21) Appl. No.: 15/094,008

(22) Filed: Apr. 8, 2016

(65) Prior Publication Data
US 2016/0297285 A1 Oct. 13, 2016

(30) Foreign Application Priority Data

Apr. 9, 2015 (DE) .......................... 10 2015 004 336

(51) Int. Cl.
*B01D 46/00* (2006.01)
*B01D 46/10* (2006.01)
*B01D 46/12* (2006.01)
*B01D 46/52* (2006.01)
*B60H 3/06* (2006.01)

(52) U.S. Cl.
CPC ....... *B60H 3/0658* (2013.01); *B01D 46/0002* (2013.01); *B01D 46/0005* (2013.01); *B01D 46/10* (2013.01); *B01D 46/125* (2013.01); *B01D 46/521* (2013.01); *B01D 46/525* (2013.01); *B01D 2271/027* (2013.01)

(58) Field of Classification Search
CPC ............ B01D 2265/026; B01D 46/521; B01D 2271/02; B01D 46/0006; B01D 46/10; B01D 46/2411; B01D 46/42; Y10S 55/31; F02M 35/0201; F02M 35/02416; F02M 35/02441; F02M 35/02491
See application file for complete search history.

(56) References Cited

U.S. PATENT DOCUMENTS 3,812,370 A * 5/1974 LaViolette .............. F24F 13/28
422/186.12
4,088,463 A * 5/1978 Smith ..................... B01D 46/12
454/292
(Continued)

FOREIGN PATENT DOCUMENTS

DE 202007018808 U1 5/2009
DE 102007057616 A1 6/2009
(Continued)

*Primary Examiner* — Amber R Orlando
*Assistant Examiner* — Brit E. Anbacht
(74) *Attorney, Agent, or Firm* — James Hasselbeck

(57) ABSTRACT

The invention relates to a filter element and filter system for filtering a fluid. The filter element (10) includes at least one, in particular flat filter bellows (12) made of a filter medium (14) having an intended raw side (52) and an intended clean side (50) situated opposite thereof. A flatly affixed sideband (28) is disposed at the front faces (16, 17, 18, 19) surrounding the filter bellows (12). A circumferential seal (32) is disposed at an outside of the sideband (28). The sideband (28) has a flap (36) projecting over the clean side (50) of the filter bellows (12), the flap (36) being arrangeable at the front faces (16, 17, 18, 19) in a V-shaped back-folded manner over the seal (32).

14 Claims, 4 Drawing Sheets

(56) References Cited

U.S. PATENT DOCUMENTS

| | | | | |
|---|---|---|---|---|
| 5,554,205 | A * | 9/1996 | Ernst | B01D 46/0005 454/158 |
| 5,902,361 | A * | 5/1999 | Pomplun | B01D 46/10 55/385.3 |
| 6,045,598 | A * | 4/2000 | Fath | B01D 29/012 55/490 |
| 6,406,509 | B1 * | 6/2002 | Duffy | B01D 46/0001 156/212 |
| 7,001,440 | B1 * | 2/2006 | Chilton | B01D 46/0046 55/337 |
| 7,261,757 | B2 * | 8/2007 | Duffy | B01D 46/0001 55/497 |
| 7,691,165 | B1 * | 4/2010 | Hammes | B01D 46/0002 210/435 |
| 8,062,404 | B2 * | 11/2011 | Volkmer | B01D 46/10 55/497 |
| 8,834,592 | B1 * | 9/2014 | Dimicelli | B01D 46/0013 55/483 |
| 9,649,584 | B2 * | 5/2017 | Burns | B01D 46/0023 |
| 9,815,012 | B2 * | 11/2017 | Cloud | B01D 46/0031 |
| 2003/0070406 | A1 * | 4/2003 | Duffy | B01D 29/031 55/497 |
| 2003/0172633 | A1 * | 9/2003 | Duffy | B01D 29/012 55/495 |
| 2005/0284116 | A1 * | 12/2005 | Duffy | B01D 46/0001 55/497 |
| 2006/0090432 | A1 * | 5/2006 | Merritt | B01D 46/0002 55/482 |
| 2006/0168926 | A1 * | 8/2006 | Dawson | B01D 39/16 55/502 |
| 2007/0012192 | A1 * | 1/2007 | Pippel | B01D 46/0005 96/417 |
| 2008/0115474 | A1 * | 5/2008 | Volkmer | B01D 29/07 55/497 |
| 2008/0120953 | A1 * | 5/2008 | Volkmer | B01D 46/10 55/493 |
| 2008/0236121 | A1 * | 10/2008 | Volkmer | B01D 46/0005 55/497 |
| 2009/0158697 | A1 * | 6/2009 | Magee | B01D 46/0002 55/492 |
| 2009/0301044 | A1 * | 12/2009 | Miller | B01D 46/0001 55/475 |
| 2011/0061352 | A1 * | 3/2011 | Stahl | B01D 46/0005 55/385.3 |
| 2013/0025246 | A1 * | 1/2013 | Burns | B01D 46/2403 55/498 |
| 2013/0232933 | A1 * | 9/2013 | Haider | B01D 46/10 55/497 |
| 2013/0327218 | A1 * | 12/2013 | Izzi | B32B 5/022 95/281 |
| 2014/0137525 | A1 * | 5/2014 | Cambpell | B01D 46/2414 55/502 |
| 2016/0040633 | A1 * | 2/2016 | Schmid | B01D 46/0001 55/502 |
| 2016/0297285 | A1 * | 10/2016 | Luley | B01D 46/0002 |
| 2017/0291128 | A1 * | 10/2017 | Luley | B01D 46/0004 |

FOREIGN PATENT DOCUMENTS

| | | |
|---|---|---|
| DE | 102009042588 A1 | 6/2010 |
| DE | 102010045682 A1 | 3/2012 |
| DE | 102013015648 A1 | 3/2015 |
| EP | 0490169 A1 | 6/1992 |

* cited by examiner

FILTER ELEMENT HAVING A FLAP AND A FILTER SYSTEM

TECHNICAL FIELD

The present invention relates to a filter element for filtering a fluid, having a flap and a filter system, in particular for use as an air filter, in particular for indoor air filtration, in particular for a vehicle.

BACKGROUND OF THE INVENTION

A filter element used, for example, as a motor vehicle indoor air filter or as a filter element for an air conditioner of a motor vehicle, serves to filter conditioned air passed from the outside into the vehicle interior. For this purpose, for example, particle or odor filters or a combination thereof are employed, which out-filter the particles and inherent odors from the ambient air. In this instance, the effectiveness of a filter or of such a filter system also depends on whether the filter system is installed in the right position in the filter housing or in an assigned filter reception of the filter housing.

A filter assembly for filtering supply air of a motor vehicle is known from the publication DE 10 2009 041 113 A1 in which flaps project at opposite situated longitudinal sides and are pivotably hinged at the filter medium. The filter element is snapped into the top part of a filter housing on the clean air side in such a manner that the flaps sealingly abut at the housing walls. In this instance, the free ends of the flaps point against the flow direction of the air. For this reason, air inflowing from the direction of the inflow side can pivot the movable flaps about their fixed end and press them by their free ends against the housing walls. In this instance, flaps made of a nonwoven fabric are used. Furthermore, the flaps made of nonwoven fabric provide a filter medium which additionally filters the supply air to the motor vehicle engine.

SUMMARY OF THE INVENTION

An object of the present invention is to create a filter element for filtering a fluid, in particular for air filtration, in particular for indoor air filtration, which enables the insertion of the filter element in a reliably tight manner into a filter housing.

A further object of the present invention is to create a filter system for filtering a fluid to receive such an exchangeable filter element, which enables the insertion of the filter element in a reliably tight manner into a filter housing.

According to one aspect of the present invention, the previously mentioned object is achieved by a filter element for filtering a fluid, which includes at least one, in particular, flat filter bellows made of a particularly zigzag-pleated filter medium having an intended raw side and an intended thereto opposite-situated clean side, a flatly affixed sideband being circumferentially disposed at the front faces surrounding the filter bellows, on the outside of which a circumferential seal is disposed. In this instance, the sideband has a flap projecting over the clean side of the filter bellows, the flap being arrangeable over the seal at the front faces in a V-shaped manner, in particular folded back at a folding edge.

According to another aspect of the present invention, a further object is achieved by a filter system which is provided for receiving such a filter element.

Advantageous embodiments and advantages of the present invention result from the additional claims, the description and the drawings.

A filter element for filtering fluids, in particular for air filtration, in particular for indoor air filtration, in particular for a vehicle, is proposed, which includes at least one, in particular flat, in particular zigzag-pleated filter bellows made of a filter medium, having an intended raw side and an intended clean side situated opposite thereto, a flatly affixed sideband being disposed, in particular, in a fully circumferential manner and in particular tightly connected to the filter bellows, at the front faces surrounding the filter bellows. In particular a fully circumferential seal is situated at an outer side of the sideband. In this instance, the sideband has a flap projecting over the clean side of the filter bellows, the flap being arrangeable at the front faces in a V-shaped back-folded manner over the seal.

According to the present invention, a part of the sideband disposed for the lateral sealing of the filter bellows, in particular, in the case of a zigzag-pleated filter medium, which projects over a bottom edge of the filter bellows delimiting the clean side, is folded back and, in this way, projects partially, in particular only partially, in a V-shaped manner jutting out from the sidebands mounted at the front faces, over the seal or its outer surface. Here, in part is to be particularly understood so that the seal or its outer surface is partially overlapped transversely to the circumferential direction of the seal. The flap overlaps the seal or its outer surface preferably in such a manner that, in particular, a fully circumferential area of an outer surface of the seal not overlapped by the V-shaped flap, which is, in particular, facing away from the sideband, in particular, disposed parallel to said sideband, remains free and, thus, continues to be sealingly abuttable at a filter housing. When inserted into a filter housing, this V-shaped flap is pressed against the seal and is at least partially, in particular, in the area of the overlap between V-flap and seal, clamped between the seal and the filter housing so that, in doing so, the flap is firmly fixated and/or abuts at the filter housing. Thus, in the combination of the V-shaped back-folded flap and the seal, a sealing of the filter element when being installed into a filter housing results because the area of an outer surface of the seal not overlapped by the V-shaped flap continues to be sealingly abuttable at a filter housing. In this manner, a simplified insertion of the filter element into a filter housing is possible, as a result of which in particular the effort for inserting the filter element into the filter housing is reduced.

The seal, which can, for example, be formed from foam rubber and be implemented as a rectangular profile, is expediently adhesively bonded onto the sideband. For this purpose, the seal can have an adhesive layer by which the seal can be adhesively bonded onto the sideband. Alternatively, the seal can also be directly applied to the sideband as a sealant bead. Since the cross section (width/length) of the filter element is advantageously selected greater than the cross section of the filter housing, an overlap results and, when the filter element is inserted, the seal is pressed into the filter housing. As a result, the seal could detach from the sideband and become leaky. By overlapping the flap with the seal, the V-flap, when the filter element is inserted into the filter housing, preferably abuts first at the housing, for example, at an edge of a housing-sided sealing area or at the housing-sided sealing area. Furthermore, by overlapping the flap with the seal, the seal is pre-press-fitted and the compression, when the filter element is inserted into the filter housing, is achieved without detaching the seal. The press-fitting is carried out in such a manner that the outer surface of the seal is moved in the direction of the sideband. Since this occurs perpendicular to the flow direction and to the installation direction, this, in this instance, is also referred to as a radial seal or a radially abutting seal. For insertion into a filter housing, the V-shaped flap is, in particular, pressed against the seal in such a manner that the V-shaped flap forms an insertion slope which reduces the shearing of the seal when being inserted into a filter housing. In this instance, the V-flap preferably experiences a force in the direction of the seal, as a result of which the seal is slightly pre-press-fitted in the area in which the V-flap abuts against said seal. In doing so, the filter element having the seal can be more easily installed in a direction normal to the intended clean side or raw side into a filter housing, in particular, if the seal in the non-press-fitted state has a larger expansion than the installation aperture. In this way, the flap assists as an insertion aid when inserting the filter element into the filter housing.

Owing to the eased insertion of the filter element into the filter housing by reducing the force during insertion and by the pre-press-fitting of the seal, the cross-sectional area of the filter element can advantageously also be enlarged since the seal can be more easily and more effectively press-fitted and, thus, the overlap with an installation dimension of the filter housing can be increased. In doing so, the filtration properties can be improved, for example, by increasing the service life and/or by reducing the inflow speed of the fluid when increasing the filtration area.

Furthermore, the seal effect is assumed by the seal as well as, at least partially, by the flap, since the volume flow presses the flap against the wall of the filter housing. In doing so, the seal effect is increased.

Advantageously, the solution according to the present invention for a flap situated at least partially over the seal in a V-shaped back-folded manner can be applied to filter elements for air filtration, in particular for indoor air filtration, in which radially press-fittable seals are used.

According to an advantageous embodiment, the flap can at least partially overlap the seal at an outer side which, in particular, is facing away from the sideband. In doing so, it is ensured that, when inserting the filter element into a housing, the flap is clamped between the seal and the wall of the filter housing and, in this way, facilitates inserting the filter element by a pre-press-fitting of the seal and an additional seal effect via the flap can also occur. In this way, the filter element can also slide more easily into the filter housing so that the risk of the seal detaching from the sideband is reduced.

Preferably, the V-shaped flap overlaps exclusively that part of an outer surface of the seal, in particular, facing away from the sideband, which is closer to a folding or bending edge at which the V-shaped flap is turned over. This area of the outer surface of the seal situated closer to the folding or bending edge is respectively preferably a particularly continuous strip covered by the V-flaps. The area of the outer surface of the seal facing away from the folding or bending edge is, thus, available as a sealing surface for sealing against a filter housing. This area of the outer surface of the seal facing away from the folding or bending edge is preferably respectively a particularly continuous sealing strip running along the V-flaps and the covered strip. The two strips, (that is, the covered strip and the sealing strip) have each preferably a width of at least 20%, preferably at least 30% of the width of the outer surface of the seal and are each, particularly preferably, equal in width. Since the V-flaps do not overlap in the corner areas of the filter element, the total width of the seal (in particular, of the outer surface) is available as sealing surface for sealing against a filter housing. In this area, the cross section of the seal is also often slightly deformed because the seal is turned over the corner. For this reason, and also owing to the small expansion of these areas, it is not harmful if the V-flaps do not offer an insertion ramp in these corner positions and cannot produce a pre-press-fitting.

According to an advantageous embodiment, the flap can be configured to reach up at least to an edge of the seal facing the clean side. In doing so, it is ensured that, when the filter element is inserted into the filter housing, the flap fully covers at least the area up to the seal and, in this way, the flap provides an additional filtration effect and sealing. In this way, the filter element can also be inserted more easily into the filter housing so that the risk of the seal detaching from the sideband is reduced.

According to an advantageous embodiment, the flap by its free end can be configured reaching up no higher than to below an edge of the seal facing the raw side. In doing so, it is ensured that the flap does not project past the seal, without which the seal abutting at the wall of the filter housing and providing a reliable seal effect would not be ensured. In this way, when inserting the filter element into the filter housing, at least one part of the seal abuts at the wall because the flap when being inserted into the filter housing is at least partially retracted and, this way, a part of the seal is exposed.

According to an advantageous embodiment, the filter medium can be pleated in a zigzag manner into pleats along pleat edges extending respectively between opposite situated front edges of the filter bellows, and can respectively have parallel running front edge surfaces on opposite situated front faces and have front surfaces on the front faces situated transversely thereto. In this instance, the sideband can seal the filter bellows at the front edge surfaces and at the front surfaces. Especially in the case of a pleated filter medium, sidebands are used to seal the front edge surfaces and the front surfaces. For this reason, it is particularly advantageous to provide this sideband with a projecting flap which can be used to insert the filter element more easily into the filter housing and to reliably seal it. In doing so, such pleated filter media are particularly advantageous for applying the solution according to the present invention having V-shaped formed flaps as insertion aid and as an additional sealing possibility.

The sidebands typically form the side surfaces of a particularly straight, for example, 4-cornered, preferably rectangular prism. Its base areas are preferably defined by the through-flown surfaces, in particular, the clean and the raw side, in particular, respectively defined by the pleat edges of the filter medium. The height of this prism is determined by the width of the sidebands (without the V-flap), which typically is circumferentially constant. Preferably, a sideband and a V-flap are provided at each side of the prism, that is, in the case of a 4-sided (for example, rectangular prism), 4 V-flaps are provided.

According to an advantageous embodiment, the seal can have a rectangular cross section. Seals having rectangular profiles are particularly advantageously suited for using flat filter elements since, in this way, the total width of the seal is used as a sealing surface. Also, in the case of a rectangular cross section, the flap can, even at a minor overlap of the flap with the seal, be clamped between the wall of the filter housing and the seal when inserting the filter element into the filter housing, and, in this way, effectively unfold the effect as insertion aid and also as an additional sealing support. The outer surface of the seal acting as a sealing surface and facing away from the sideband is preferably substantially aligned parallel to the outer surface of the sideband. This means that the outer surface is at a distance at least over its total width from the sideband, in particular, is spaced substantially constant in such a manner that a direct approaching of or a transition to the surface of the sideband, for example, in the form of a wedge or the like, cannot occur. For this reason, a defined press-fitting of the seal, a defined sealing position in the housing, smaller dimensional tolerances and, thus, a reproducible good sealing can be cost-effectively achieved, in particular in conjunction with the housing sealing surface.

Preferably, the seal does not cover the total width of the sideband. Rather, it is preferred that the seal is disposed at a distance from the bending edge of the V-flap in such a manner that the V-flap forms an acute angle when folded over and abuts at the outer surface of the seal.

Preferably, the distance of the seal from the bending edge is at least equal in size as the thickness of the seal, that is, as the distance of the outer surface of the seal from the sideband. Furthermore, in order to not form an angle too acute between V-flap and sideband and in order to still ensure a sufficient press-fitting of the seal and/or to prevent an over-bending of the V-flap during installation, the distance of the seal from the bending edge is no more than 4 or 2 times and, particularly preferably, no more than 2 times the size as the thickness of the seal. In this instant, a ratio of 1:1 to 2:1 of distance to thickness has been proven optimal so that, in the non-spanned state and the V-flap abutting on the seal, acute angles of between approximately 30° and approximately 45° are formed between V-flap and sideband.

On the side of the seal facing away from the bending edge, a section of the sideband is preferably also provided, which lies open, that is, is not covered by the seal, and is also preferably equal in size and, furthermore preferably, twice the size as the width and/or the thickness of the seal. In this manner, a defined sealing position in the housing can be created and a cost-effective sealing contributing to the simple and secure installation can be provided. It is further preferable to dispose the seal closer to the clean side, that is, closer to the bending edge of the V-flap. This means that preferably the distance of the seal from the inflow-sided edge of the sideband is larger than the distance from the outflow-sided (clean-sided) edge, that is, from the bending edge. In this instance, the distance of the seal from the inflow-sided edge of the sideband is preferably 50% and, particularly preferably, 100% larger than the distance from the outflow-sided edge. An arrangement of the seal near the clean side reduces the clean-air-sided volume and, for this reason, the size of the surfaces which would be negatively affected by leakage.

Preferably, the width of the seal is to be no more than 50%, particularly preferably, no more than 30% of the width of the sideband. Furthermore, the height of the non-spanned (relaxed) seal is preferably to be no more than 50%, preferably no more than 30%, particularly preferably no more than 25% of the width of the sideband.

According to an advantageous embodiment, the sideband can, for forming the flap at a circumference of the clean side, be configured in a circumferentially notched or perforated manner. By notching or perforating the sideband, a reliable bending edge can be created so that the flap can, by back-folding the protruding sideband, be folded back in a very defined and V-shaped manner. Especially in the case of a firmer nonwoven material as a sideband, a targeted weak point advantageous for forming a defined flap can be illustrated.

According to an advantageous embodiment, the seal can include foam rubber or cellular rubber. These materials are particularly advantageous for use as sealing materials and, for this reason, are also available for a wide application. The materials also have the needed elasticity to ensure a reliable sealing when the cross section of the seal suitably overlaps with an installation dimension of the filter housing.

Preferably, a seal is formed from a preferably rectangular endless profile which, cut to length and parallel to the edges of the sidebands, is circumferentially affixed in the shape of a closed ring to the sidebands, so that the filter medium and the sidebands are surrounded in a fully circumferential manner.

According to an advantageous embodiment, the seal for the intended installation in a filter housing can be configured for an overlap of greater than 10%, preferably greater than 20% of the thickness of the seal with an installation dimension of the filter housing. Such an overlap ensures a reliable seal effect when press-fitting the seal during installation in a filter housing, in particular, with the assistance of a V-shaped back-folded flap.

According to an advantageous embodiment, the sideband and the flap can include a nonwoven material. A nonwoven material or a similar textile material is expediently used as a sideband and, for this reason, also as a flap, because such materials have the advantage of being easily processable and of being additionally suitable for the lateral sealing of the filter element.

According to a further aspect, the present invention relates to a filter system for filtering a fluid, having a filter element, the filter element being exchangeable in a filter housing of the filter system and the filter element providing a filter bellows which has at its front faces a flatly affixed sideband. A circumferential seal is situated at an outer side of the sideband. In this instance, a flap of the sideband projecting over the clean side of the filter bellows is disposed at least at the front faces in a V-shaped back-folded manner over the seal.

In such a filter system according to the present invention, a part of the sideband disposed for the lateral sealing of the filter bellows, in particular, in the case of a zigzag-pleated filter medium, which projects over a bottom edge of the filter bellows delimiting the clean side, is folded back and, in this way, projects, in a V-shaped manner jutting out from the sidebands mounted at the front faces, partially over the seal. During insertion into the filter housing, this V-shaped flap is press-fitted against the seal and is at least partially clamped between the seal and the filter housing so that, in doing so, the flap is firmly fixated at the filter housing. In doing so, when combining the V-shaped back-folded flap and the seal, a sealing of the filter element is caused by the flap and also by the seal during installation in the filter housing. In this manner, a simplified insertion of the filter element into the filter housing is possible, as a result of which the effort for inserting the filter element into the filter housing is reduced.

According to an advantageous embodiment, the flap can, in the installed state of the filter element, at least partially overlap the seal at an outer side. In doing so, it is ensured that, when inserting the filter element into a housing, the flap is clamped between the seal and the wall of the filter housing and, in this way, facilitates inserting the filter element by a pre-press-fitting of the seal and an additional seal effect via the flap can also occur. In this way, the filter element can also slide more easily into the filter housing so that the risk of the seal detaching from the sideband is reduced.

According to an advantageous embodiment, the flap can, in the installed state of the filter element, at least be partially disposed between the seal and a housing wall of the filter element. In doing so, the flap is clamped between the wall of the filter housing and the seal so that, on doing so, it is in any case ensured that the flap additionally aids in the seal effect of the seal and also that the seal, when inserting the filter element into the filter housing, cannot be detached from the sideband onto which the seal is adhesively bonded or foamed.

According to an advantageous embodiment, the flap in the installed state can be situated to the front faces in an acute angle, preferably smaller than 45°. Such a geometric arrangement promotes the insertion process of the filter element into the filter housing. In doing so, the force used for the insertion, which has to be exerted onto the filter element, is reduced. Thus, the risk of the seal being able to detach from the sideband when the filter element is inserted into the filter housing is also reduced.

According to a further aspect, the present invention relates to a utilization of the filter system for air filtration, in particular for indoor air filtration, in particular for a vehicle.

BRIEF DESCRIPTION OF THE DRAWINGS

Further advantages result from the following description of the drawings. The drawings represent exemplary embodiments of the present invention. The drawings, the description and the claims include a plurality of combined features. The skilled person appropriately views the features also individually and further combines them in a purposeful manner.

In an exemplary manner.

DESCRIPTION OF THE INVENTION

Figure 1:
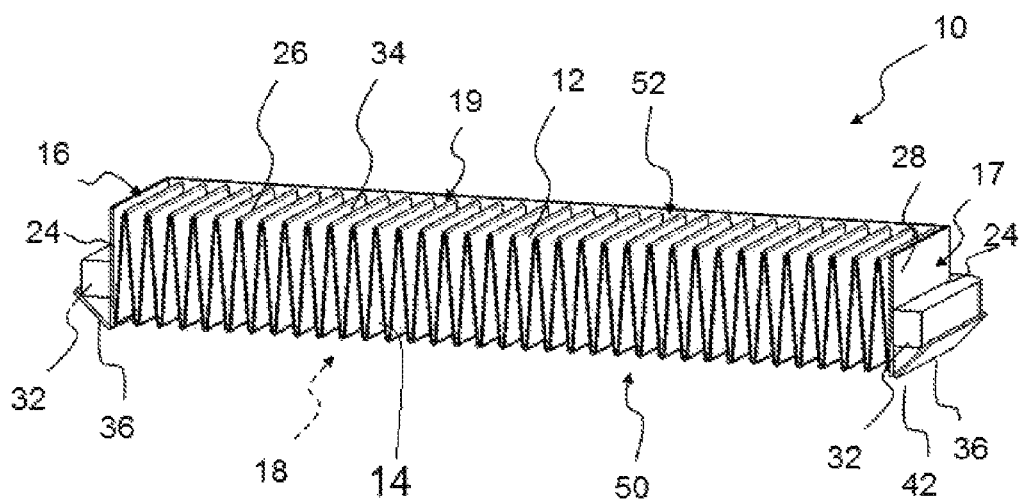
FIG. 1 shows an isometric view of a longitudinal section through a filter element having a zigzag-pleated filter medium and a V-shaped back-folded flap according to an exemplary embodiment of the present invention.

In the figures, same or similar components are referenced having the same reference characters. The figures only show examples and are not to be understood as limiting.

FIG. 1 shows an isometric view of longitudinal section through a filter element 10 for filtering a fluid, in particular for air filtration, preferably for indoor air filtration, in particular of a vehicle, having a zigzag-pleated filter medium 14 and a V-shaped back-folded flap 36 according to an exemplary embodiment of the present invention. Filter medium 10 includes a flat filter bellows 12 made of a filter medium 14 having an intended raw side 52 and an intended clean side 50 situated opposite thereof. A flatly affixed sideband 28 is disposed at front faces 16, 17, 18, 19 surrounding filter bellows 12. A circumferential seal 32 is disposed at the outside of sideband 28. Sideband 28 has a flap 36 projecting over clean side 50 of filter bellows 12, flap 36 being disposed at front faces 16, 17, 18, 19 in a V-shaped back-folded manner over seal 32.

Filter medium 14 is pleated in a zigzag manner into pleats 34 along pleat edges 26, which each extend between opposite situated front edges 22 of filter bellows 12. Filter medium 14 includes respectively on opposite situated front faces 18, 19 front edge surfaces 20 running parallel to each other. Furthermore, filter medium 14 has front surfaces 24 on the thereto transversely situated front faces 16, 17, filter bellows 14 being sealed at front edge surfaces 20 and front surfaces 24 by sideband 28. Seal 32 has a rectangular cross section and includes usually foam rubber or cellular rubber which is a particularly advantageous sealing material having suitable elastic properties. Flap 36 overlaps seal 32 slightly on the outside because flap 36 is configured to reach up to edge 38 of seal 32 facing clean side 50. Alternatively, flap 36 by its free end 37 could also be configured to reach up to below an edge 39 of seal 32 facing raw side 52. Sideband 28 is, for forming flap 36 at a circumference 42 of clean side 50, expediently configured in a circumferentially notched or perforated manner to so enable a reliable back-folding of the flap. Sideband 28 and flap 36 include a nonwoven material or a similar textile material because these materials are well-sealing and are easy to process.

Figure 2:
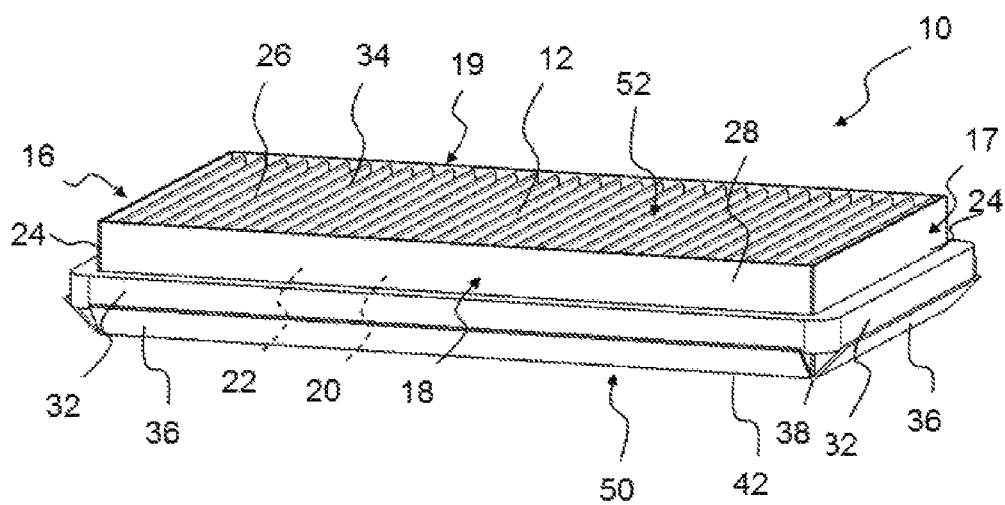
FIG. 2 shows an isometric view of the filter element according to FIG. 1.

FIG. 2 shows complete filter element 10 according to FIG. 1 in an isometric view. Filter element 10 is circumferentially sealed by sideband 28. The seal formed by a rectangular cross section is disposed, for example, adhesively bonded, also circumferentially on the outside of sideband 28. Flap 36 formed as an excess of sideband 28 over clean side 50 of filter element 10 is back-folded in a V-shaped manner over clean-sided edge 38 of seal 32 at all front faces 16, 17, 18, 19 in the direction of raw side 52. At the corners of filter element 10, non-engaging gussets of flap 36 result, owing to the creation of flap 36, from sideband 28. Sidebands 28 form a straight, presently 4-cornered, rectangular prism. Its base areas are preferably defined by the through-flown surfaces, in particular, clean side 50 and raw side 52, in particular, respectively defined by the pleat edges of filter medium 14. The height of this prism is determined by the width of sidebands 25 (without the V-flap), which preferably is circumferentially constant. As shown, a sideband 28 and a flap 36 are preferably provided at each side of the prism, that is, 4 flaps are provided so that an installation-simplifying effect can be circumferentially achieved.

Figure 3:
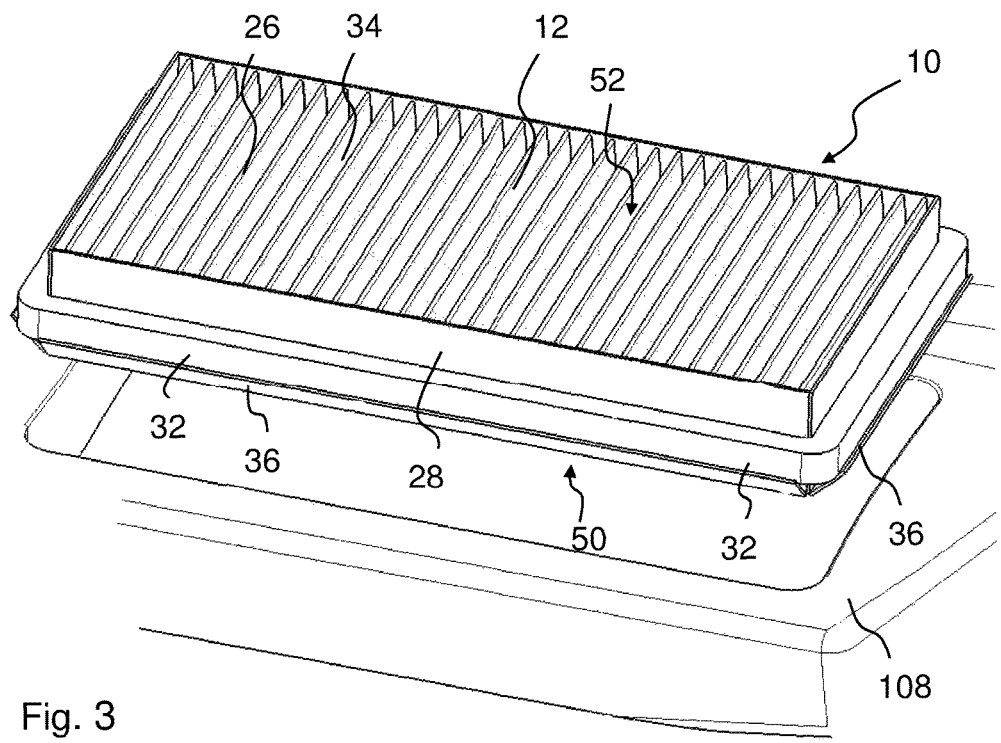
FIG. 3 shows the filter element according to FIG. 1 when being inserted into a filter housing.

FIG. 3 shows filter element 10 according to FIG. 1 when being inserted into a filter housing 108. Filter element 10 can be inserted into the bottom part of filter housing 108 by lowering from above. In this instance, flap 36 abuts at seal 32 so that flap 36 facilitates the insertion of filter element 10 into filter housing 108 by reducing the required insertion force. Moreover, by clamping flap 36 between the wall of filter housing 108 and seal 32, an additional sealing effect is promoted.

Figure 4:
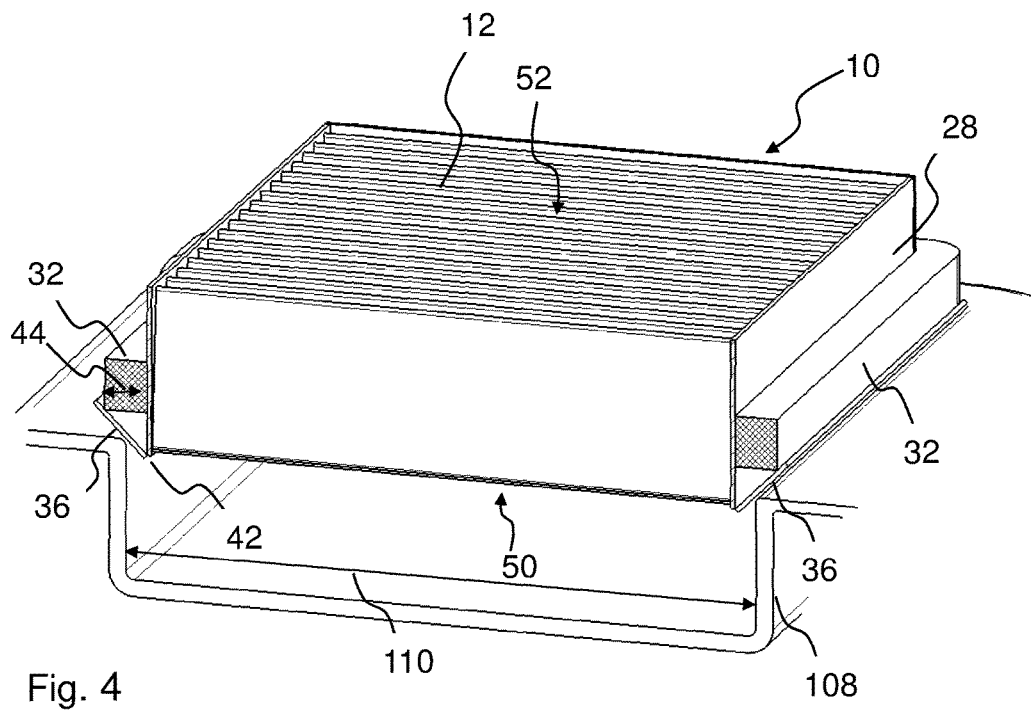
FIG. 4 shows the insertion of the filter element into a filter housing according to FIG. 3 in a cross section parallel to the pleats of the filter medium.

FIG. 4 shows the insertion of filter element 10 into a filter housing 108 according to FIG. 3 in a cross section parallel to the pleats of filter medium 14. Filter element 10 is guided directly above the aperture of the bottom part of filter housing 108 and then is lowered for further insertion into filter housing 108. This illustration shows that seal 32 for the intended installation into filter housing 108 is expediently configured for an overlap of greater than 10%, preferably of greater than 20% of thickness 44 of seal 32 with an installation dimension 110 equating to the clearance of filter housing 108. When further inserting filter element 10 into filter housing 108, flap 36 abuts at the wall of filter housing 108 between seal 32 and the wall. When inserting filter element 10, seal 32 is compressed to so, together with flap 36, unfold the full seal effect.

Figure 5:
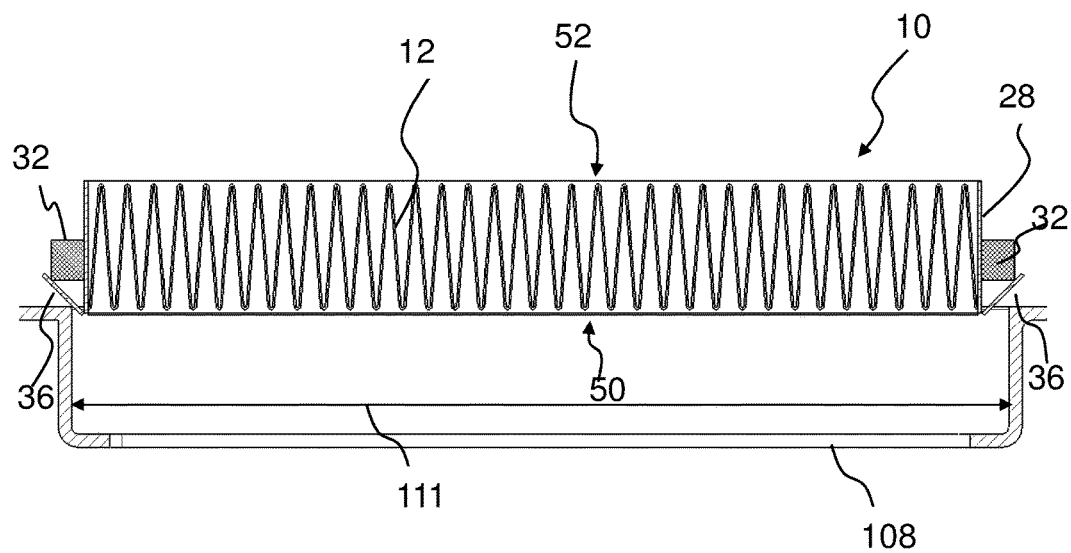
FIG. 5 shows the insertion of the filter element into a filter housing according to FIG. 3 in a longitudinal section.

FIG. 5 shows the insertion of filter element 10 into a filter housing 108 according to FIG. 3 in a longitudinal section, thus, in the other dimension. Here also, the overlap of seal 32 in the non-press-fitted state with installation dimension 111 can be seen in this dimension, as a result of which an effective and reliable sealing of filter element 10 against filter housing 108 is achieved.

Figure 6:
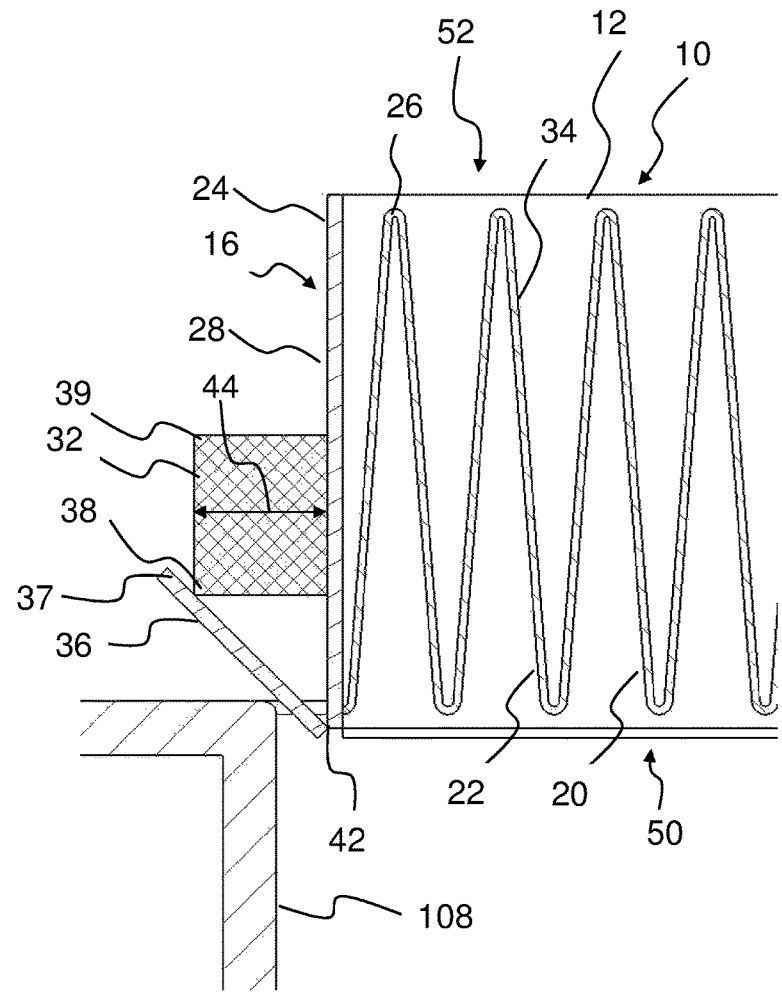
FIG. 6 shows a cutout detail of FIG. 5 with emphasis on the seal and the flap.

FIG. 6 shows a cutout detail of FIG. 5 with an emphasis on seal 32 and flap 36. Filter bellows 12 having erected pleats 34 of filter medium 14, which by pleat edges 26 respectively represent raw side 52 or clean side 50, is cut parallel to front edge surface 20 of front edge 22. In the plane transverse thereto, the filter bellows is closed off by front surface 24 at front face 16. Filter bellows 12 is fully circumferentially closed off and sealed by sideband 28. Seal 32, formed by a rectangular cross section having a thickness 44, is adhesively bonded onto sideband 28. Sideband 28 is, for forming flap 36 at a circumference 42 of clean side 50, expediently configured in a circumferentially notched or perforated manner to so enable a reliable back-folding of flap 36. As it is preferable and as shown in FIG. 6, the distance of seal 32 from the bending edge (here, circumference 42) approximately corresponds to thickness 44 of seal 32 so that, when back-folding flap 36, an acute angle of no more than 45° to outside 28 of sideband 28 can be formed. As can be seen from FIGS. 7 and 8, the angle becomes more acute during installation by the compression of seal 32. In the embodiment in FIG. 6, flap 36 is configured to reach with the free end of flap 36 up to clean-sided edge 38 of seal 32. Alternatively, flap 36 can also be configured to reach up to raw-sided edge 39 of seal 32. When inserting filter element 10 into filter housing 108, flap 36 is first pressed in the direction of filter element 10. In this instance, seal 32 is also press-fitted so that filter element 10 having flap 36 and seal 32 can be guided into the aperture of filter housing 108 and can there assume a firmly sealed position.

In the shown embodiment and as preferable, seal 32 is formed from a rectangular endless profile which, cut to length and parallel to the edges of sidebands 28, is circumferentially affixed in the shape of a closed ring to sidebands 28 so that filter medium 14 and sidebands 28 are surrounded in a fully circumferential manner.

Figure 7:
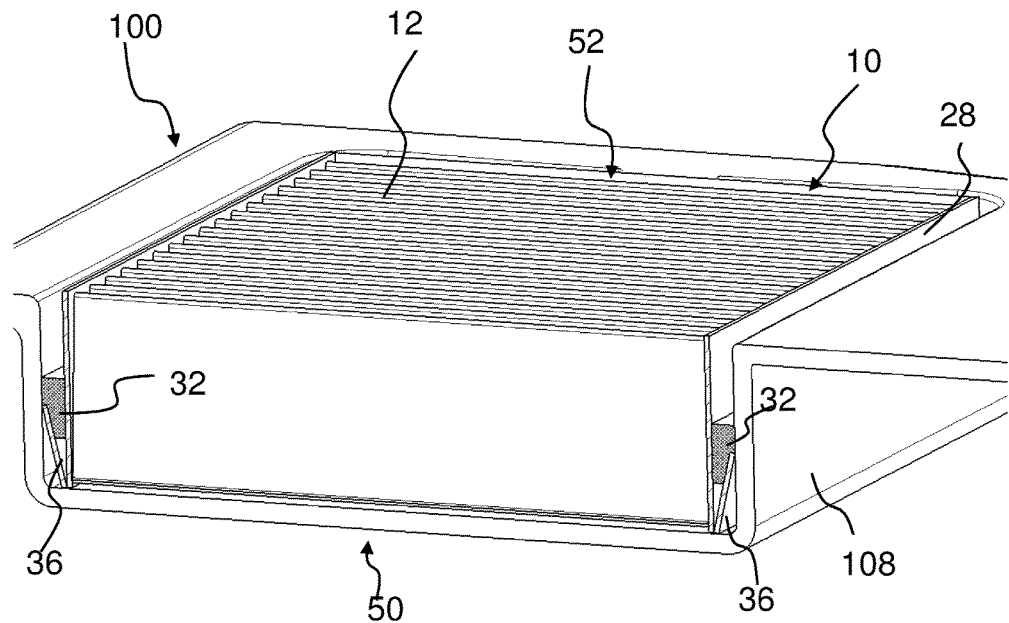
FIG. 7 shows a filter system according to an exemplary embodiment of the present invention having a filter element inserted into a bottom part of the filter housing.

FIG. 7 shows filter system 100 according to an exemplary embodiment of the present invention, which is provided for air filtration, in particular for indoor air filtration, in particular for a vehicle, having filter element 10 inserted into the bottom part of filter housing 108. Filter element 10 is, for this reason, exchangeably disposed in filter housing 108 of the filter system. Filter element 10 provides filter bellows 12 having flatly applied sideband 28 at front faces 16, 17, 18, 19. Circumferential seal 32 is disposed at the outside of sideband 28. Flap 36 of sideband 28 projecting over clean side 50 of filter bellows 12 is disposed at front faces 16, 17, 18, 19 in a back-folded manner over seal 32. In the installed state of filter element 10 shown in FIG. 7, flap 36 at least partially overlaps seal 32 at the outside. In this way, flap 36 in the installed state of filter element 10 is at least partially disposed between seal 32 and a housing wall 112 of filter housing 108 and can, in this way, have an additional seal effect by means of the additional press-fitting of seal 32 and carry out a clamping of flap 36 between the wall of filter housing 108 and seal 32.

Figure 8:
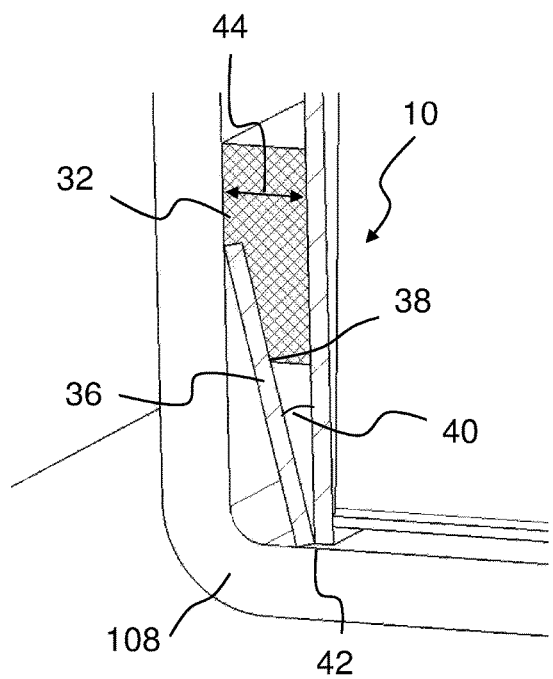
FIG. 8 shows a cutout detail of FIG. 7 with emphasis on the seal and the flap.

For this purpose, FIG. 8 shows a cutout detail of FIG. 7 with emphasis on seal 32 and flap 36. It can be seen from FIG. 7 that seal 32 is press-fitted by inserting filter element 10 into filter housing 108 so that thickness 44 of seal 32 in the installed state is significantly reduced because of the overlap of sealing 32 with installation 110, 111. Flap 36 overlaps in the installed state seal 32 also partially in that flap 36 is clamped between the wall of filter housing 108 and seal 32. In the installed state, flap 36 is situated to front faces 16, 17, 18, 19 of filter element 10 at an acute angle 40 preferably smaller than 45°. By situating flap 36 at acute angle 40, the function of flap 36 as an insertion aid is promoted because, in this manner, filter element 10 can be inserted into filter housing 108 with reduced force.

What is claimed is:

1. A filter element for filtering fluids, comprising:
   at least one flat filter bellows of a filter medium having an intended raw side; and
   an intended clean side, the raw and clean sides respectively arranged on opposite front faces of the filter bellows;
   wherein a flatly affixed sideband is circumferentially arranged at front faces surrounding the filter bellows;
   wherein a circumferential seal is arranged outside of the sideband;
   wherein the sideband has a flap projecting over the clean side of the filter bellows;
   wherein the flap is arranged at the front faces in a V-shaped back-folded manner over the seal;
   wherein the circumferential seal has a radially outer surface;
   wherein the flap only partially overlaps the radially outer surface of the circumferential seal, leaving a circumferential sealing portion of the radially outer surface of the circumferential seal uncovered by the flap, the circumferential sealing portion of the radially outer surface remaining exposed and uncovered by the flap to improve sealing by directly contacting against and sealing against an interior of a filter housing, when the filter element is in an installed state.

2. The filter element according to claim 1, wherein the outer surface of the circumferential seal is disposed parallel to the sideband.

3. The filter element according to claim 1, wherein the flap is configured to reach up at least to an edge of the circumferential seal facing the clean side.

4. The filter element according to claim 1, wherein the flap by its free end is configured to reach up no further than to an edge of the circumferential seal facing the raw side.

5. The filter element according to claim 1, wherein the filter medium is pleated along pleat edges into pleats extending respectively between opposite front faces of the filter bellows, and
   respectively has front edge surfaces running parallel to each other on the opposite-situated front faces; and
   has front surfaces on the thereto transversely situated front faces;
   wherein the filter bellows is sealed at the front edge surfaces and front surfaces by the sideband.

6. The filter element according to claim 1, wherein the circumferential seal has a rectangular cross section.

7. The filter element according to claim 1, wherein the sideband is configured in a circumferentially notched or perforated manner, for forming the flap at a circumference of the clean side.

8. The filter element according to claim 1, wherein the circumferential seal comprises foam rubber or cellular rubber.

9. The filter element according to claim 1, wherein the circumferential seal for the intended installation into a filter housing is configured for an overlap of greater than 10% of the thickness of the circumferential seal with an installation dimension of the filter housing.

10. The filter element according to claim 1, wherein the sideband and the flap comprise a nonwoven material or are made of a nonwoven material.

11. A filter system for filtering a fluid, comprising:
a filter system having a filter housing; and
the filter element according to claim 1 exchangeably disposed in the filter housing of the filter system, the filter element including a filter bellows having a flatly affixed sideband at front faces;
wherein a circumferential seal is disposed at the outside of the sideband, and
wherein a flap of the sideband projecting over the clean side of the filter bellows is disposed at the front faces in a V-shaped back-folded manner over the circumferential seal.

12. The filter system according to claim 11, wherein in an installed state of the filter element, the flap only partially overlaps the circumferential seal at an outside.

13. The filter system according to claim 11, wherein in an installed state of the filter element, the flap is disposed only partially between the circumferential seal and a housing wall of the filter housing.

14. The filter system according to claim 11, wherein in an installed state, the flap is situated to the front faces at an acute angle of less than 45 degrees.

* * * * *